United States Patent
Pearsall

(10) Patent No.: US 6,442,261 B1
(45) Date of Patent: Aug. 27, 2002

(54) CALL RECOVERY METHOD AND APPARATUS FOR AN ATTENDANT TELEPHONE SET

(75) Inventor: Susan H. Pearsall, Bradley Beach, NJ (US)

(73) Assignee: Avaya Technology Corp., Basking Ridge, NJ (US)

(*) Notice: Subject to any disclaimer, the term of this patent is extended or adjusted under 35 U.S.C. 154(b) by 0 days.

(21) Appl. No.: 09/239,435

(22) Filed: Jan. 28, 1999

(51) Int. Cl.[7] ................................................ H04M 1/56
(52) U.S. Cl. ........................ 379/142; 455/564; 379/354
(58) Field of Search .............................. 379/142, 93.17, 379/93.23, 355, 356, 357, 354, 157, 156, 164; 455/564, 566

(56) References Cited

U.S. PATENT DOCUMENTS

| | | | | |
|---|---|---|---|---|
| 4,665,545 A | * | 5/1987 | Galensky et al. ........... 379/158 |
| 5,153,908 A | * | 10/1992 | Kakizawa et al. ........... 379/157 |
| 5,402,477 A | * | 3/1995 | McMahan et al. .......... 379/201 |
| 5,568,546 A | * | 10/1996 | Marutiak .................... 379/355 |
| 5,703,934 A | | 12/1997 | Zicker et al. ................. 379/61 |
| 5,859,903 A | * | 1/1999 | Lee ............................ 379/157 |
| 5,878,123 A | * | 3/1999 | Boakes ....................... 379/142 |
| 5,956,395 A | * | 9/1999 | Song .......................... 379/209 |

* cited by examiner

*Primary Examiner*—Wing F. Chan
*Assistant Examiner*—Rexford Barnie

(57) ABSTRACT

A call recovery method and apparatus for an telephone set that receives multiple incoming calls and automatically dials the telephone number of the incoming call in response to the attendant pressing the call appearance button assigned to one of the incoming telephone calls. Incoming telephone calls from calling parties are received at the telephone set and assigned to a next available call appearance button, preferably in sequential order. The identified telephone number associated with each incoming telephone call is stored in a memory device. In response to the attendant's selection of one of the call appearance buttons, the stored telephone number of the calling party of the incoming call assigned to the selected call appearance button is automatically redialed.

6 Claims, 2 Drawing Sheets

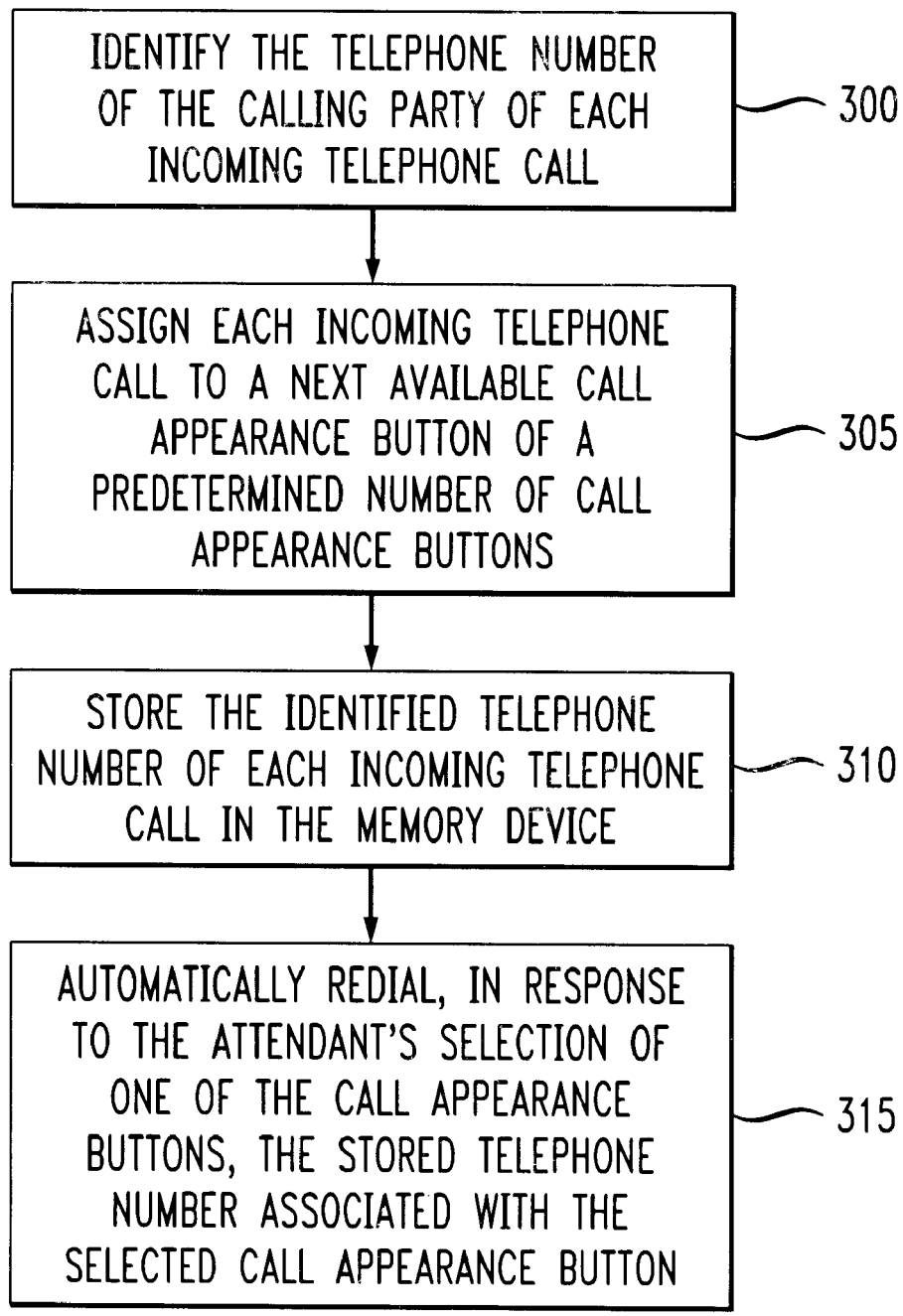

CALL RECOVERY METHOD AND APPARATUS FOR AN ATTENDANT TELEPHONE SET

BACKGROUND OF THE INVENTION

1. Field of the Invention

The present invention relates to a call recovery system for an attendant telephone set, and a method of using the same. In particular, the invention is directed to an attendant telephone set with multiple call appearance buttons. When one of the call appearance buttons on the set is selected the associated telephone number of the calling party of the incoming call is automatically redialed.

2. Background of the Invention

All too often while an operator is answering telephone calls at an attendant telephone set capable of receiving multiple incoming calls one of the incoming calls will inadvertently be disconnected during transfer to a called party or otherwise. In this and other situations, the called party is unable to recover the lost call.

Call recovery features have been developed to reinstate an incoming call. One such technique is referred to as "*69". The telephone number of the last incoming call to a called party location may be automatically redialed by pressing the buttons "*", followed by the number "6" and then the number "9". By pressing this sequence of buttons the telephone number of the calling party is automatically dialed and displayed on the LED, if available. This feature, however, is limited in that only the last call that has been dialed to a called party location may be retrieved. In addition, the "*69" feature is inefficient in that it requires the user to press three buttons.

The problem associated with the "*69" feature may be overcome by using a call logging feature, wherein a caller identification list is provided on a display. The identification, e.g. telephone number, of a predetermined number of calls dialed into a called party location are stored in a memory device. A user at the called party location can scroll down the caller identification list and select a particular telephone number. Once selected the telephone number of the calling party is automatically dialed. Accordingly, a user can select the caller identification of a predetermined number of previous callers, for example, the last caller, the second to the last caller, or the last caller identified in the list. This technique is disadvantageous in that it requires that the telephone set include a display on which the caller identification list may be viewed, and by way of which one of the telephone numbers in the list is selected.

It is therefore desirable to develop a call recovery system that overcomes the disadvantages associated with conventional call recovery methods, and in particular, a call recovery system for an attendant telephone set that receives multiple incoming telephone calls, yet only requires the operator or user to press a single call appearance button to automatically redial and recover an incoming call, thereby eliminating the need to scroll through a list of caller identifications on a display.

SUMMARY OF THE INVENTION

For the purpose of this invention the term "attendant" is defined as an operator or user of an attendant telephone set.

The present invention is directed to a method for recovering calls using an attendant telephone set having a predetermined number of call appearance buttons. A plurality of incoming telephone calls from calling parties are received at the attendant telephone set, and the telephone number of each calling party is identified and stored in a memory device. Each incoming telephone call is assigned to a next available call appearance button of the predetermined number of call appearance buttons. In response to an attendant's selection of one of the call appearance buttons, the stored telephone number of the calling party of the incoming call assigned to the selected call appearance button is automatically redialed.

In addition, the invention relates to a call recovery system for performing the method described above. The call recovery system includes an attendant telephone set that receives multiple incoming telephone calls. A processor identifies a telephone number of the calling party of each incoming telephone call and assigns each incoming telephone call to a next available call appearance button of the predetermined number of call appearance buttons. A memory device stores the identified telephone number of the calling party of each incoming telephone call. In response to an attendant's selection of one of the call appearance buttons, the processor automatically redials the stored telephone number of the calling party assigned to the selected call appearance button.

BRIEF DESCRIPTION OF THE DRAWINGS

The foregoing and other features of the present invention will be understood more readily from the following detailed description and drawings of an illustrative embodiment of the invention, in which like reference numerals delineate similar elements throughout the several views, and wherein:

FIG. 3 is a flow chart illustrating the call recovery method for the attendant telephone set embodying the present invention.

DETAILED DESCRIPTION OF THE INVENTION

Figure 1:
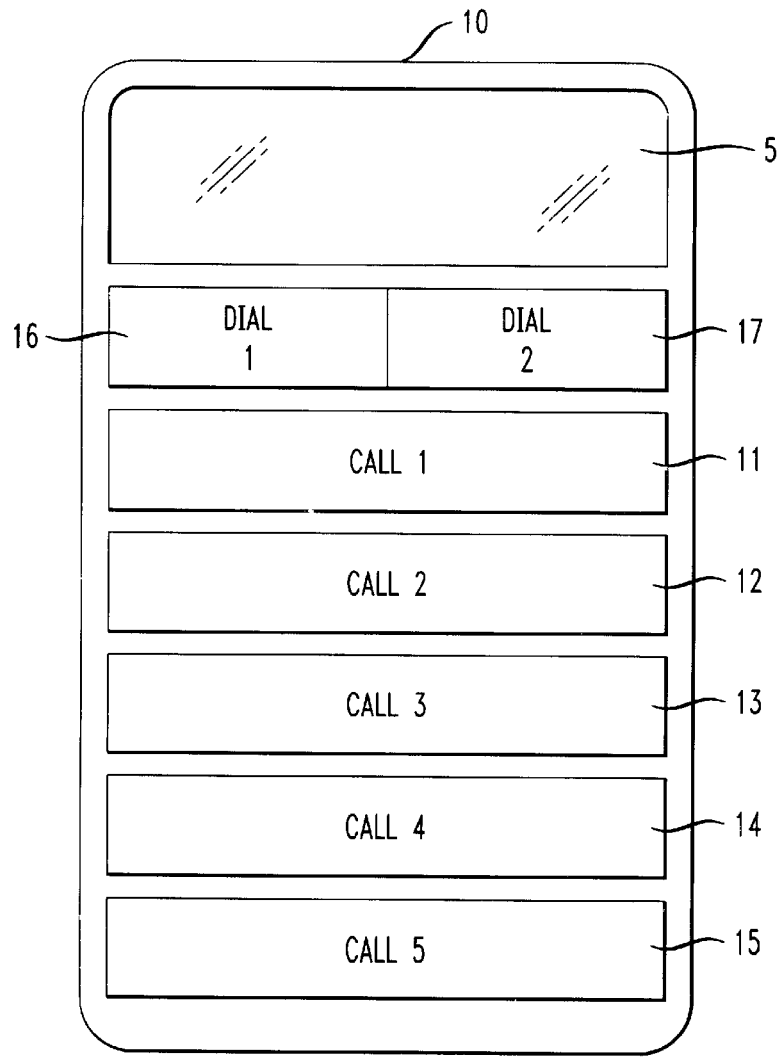
FIG. 1 is an example arrangement of multiple call appearance buttons on a Receiver base of an attendant telephone set embodying the call recovery features in accordance with the present invention.

FIG. 1 is an example of the arrangement of a receiver base of an attendant telephone set in accordance with the present invention. It should be noted that the number, labeling, and arrangement of the buttons on the receiver base of the telephone set are for illustrative purposes only, and not intended to limit the scope of the invention. The attendant telephone set is capable of receiving multiple incoming calls. In a preferred embodiment, the administrator or manufacturer dedicates "Call" buttons exclusively to receiving incoming calls and "Dial" buttons exclusively to placing outgoing calls.

Incoming calls are transmitted through a single incoming telephone line to the attendant telephone set 10 and queued therein, or alternatively, the incoming calls may be transmitted to the attendant telephone set via multiple incoming telephone lines. By way of example, the attendant telephone set 10 in accordance with the present invention is arranged with five consecutively numbered call appearance buttons 11, 12, 13, 14, 15, labeled "Call" buttons, for receiving at most five different incoming telephone calls at any time, and two consecutively numbered "Dial" buttons 16, 17 for placing at most two outgoing telephone calls at the same time. Incoming calls to the telephone set are preferably assigned to the next available call appearance button ("Call" buttons) in sequential order and in a continuous loop. For example, a first incoming call is assigned to Call button #1. Regardless of whether Call button #1 is "idle" that is, not currently assigned an incoming telephone call, the next incoming call will automatically be assigned to the next available call appearance button, for example, Call button #2. Subsequent incoming calls are routed to the next available call appearance button in sequential order, irrespective of the availability of any previous call appearance button. In summary, if N represents the number of the call appearance button to which the last incoming call was assigned, then the current incoming call is assigned to the next available call appearance button N +1 in sequential order.

In a preferred embodiment the incoming telephone calls are assigned to the next available call appearance button in sequential order. This is particularly advantageous in that it provides an extended period of time with which the attendant may recover the lost or unanswered call by simply selecting the associated call appearance button before the caller identification information stored in the memory device is updated with information concerning a new incoming call, as described further below. It should be noted, however, that the incoming telephone calls need not be assigned to the multiple call appearance buttons in any particular order, for example, the incoming telephone calls may be assigned in a random manner to the first available call appearance button. For ease of illustration the call recovery method and system embodying the present invention is shown and described for incoming calls assigned to the multiple call appearance buttons in sequential order.

Figure 2:
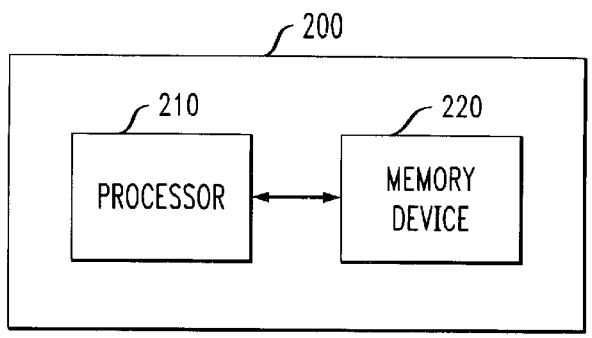
FIG. 2 is a functional block diagram of a preferred embodiment of the call recovery system for an attendant telephone set embodying the present invention.

FIG. 2 shows a block diagram of an attendant telephone set 200 with the call recovery circuitry in accordance with the present invention. Telephone set 200 includes a processor 210 for receiving and assigning the multiple incoming calls to the call appearance buttons, in sequential order and in a continuous loop. The relationship between the first eight incoming calls and assigned call appearance buttons for an attendant telephone set with five available call appearance buttons is shown in Table 1.

TABLE 1

Incoming calls and Assigned Call Appearance Button

| Incoming Call | Assigned Call Appearance Button |
|---|---|
| 1st | 1 |
| 2nd | 2 |
| 3rd | 3 |
| 4th | 4 |
| 5th | 5 |
| 6th | 1 |
| 7th | 2 |
| 8th | 3 |
| 9th | 4 |

Specifically, the first incoming telephone call is assigned to Call button #1, the second call to Call button #2, the third call to Call button #3, the fourth call to Call button #4, and the fifth call is connected to Call button #5. After assigning the fifth incoming telephone call to Call button #5 (the last call appearance button), the next incoming telephone call is assigned to the first call appearance button, namely, Call button #1, and the process continues by assigning the subsequent incoming calls to the next call appearance button in sequential order. Thus, the sixth incoming call is routed to Call button #1. This is advantageous, in that at any time up to, but not including, the sixth incoming call, the attendant may select one of the first five call appearance buttons to automatically call back the associated incoming caller. For instance, by pressing the Call #1 button a connection is automatically reestablished with the first caller, by pressing the Call #2 button a connection is automatically reestablished with the second caller, and so on for each call button.

In another example, if the next call appearance button in sequential order is unavailable then the incoming telephone call is assigned to the next available call appearance button in sequential order. For example, if Call buttons #1 and #2 are available, but Call button #3 is unavailable, then the third call is assigned to Call button #4 and all subsequent incoming calls are assigned in a similar manner to the next available call appearance button.

The attendant telephone set includes a memory device 220 connected to the processor 210 for storing the telephone number of the last calling party assigned to each call appearance button until a new incoming call is assigned to that button. In the example shown in FIG. 1, since there are five call appearance buttons, the telephone numbers of the calling parties are updated at least every fifth call after the particular call appearance button is assigned (if all five call appearance buttons are available), but may be updated more frequently depending on the number of unavailable call appearance buttons. Conventional caller identification techniques are used to identify the telephone number of the calling party assigned to each call appearance button. Once identified the telephone number of the caller assigned to each call appearance button is stored in an allotted area in the memory device. Alternatively, the name of the caller may also be identified and stored in the memory device.

FIG. 3 is a flow chart of the preferred call recovery system in accordance with the present invention. In step 300, a telephone number of the calling party of each incoming call is identified using well known and widely used caller identification techniques. As each incoming call is received at the telephone set, in step 305 it is assigned to a next available call appearance button in sequential order from a predetermined number of call appearance buttons starting with a first call appearance button through a last call appearance button. The incoming telephone calls are assigned in a continuous loop to one of the predetermined number of incoming call appearance buttons, in sequential order, so that the next call appearance button after the last call appearance button is the first call appearance button. In step 310, the identified telephone number of each incoming telephone call is stored in an area of the memory device allocated to the call appearance button to which the incoming call was assigned. The attendant selects the call appearance button to which the incoming telephone call to be recovered was assigned. Thereafter, in step 315, the associated telephone number of the selected call appearance button is retrieved from the memory device and automatically redialed.

By way of example, the operation of an attendant telephone set with five call appearance buttons (all of which are available) in accordance with the present invention, will be described for eight incoming calls (all of which are answered) from callers at the telephone numbers listed in Table 2.

TABLE 2

Telephone Numbers of the First Eight Incoming Calls

| Incoming Call | Telephone Number |
|---|---|
| 1 | (314) 629-1150 |
| 2 | (198) 292-4400 |
| 3 | (501) 544-0001 |
| 4 | (212) 119-0922 |
| 5 | (302) 333-9399 |
| 6 | (215) 555-2317 |
| 7 | (610) 887-5643 |
| 8 | (601) 241-8076 |

A first incoming call is dialed to a called party and the telephone set rings and the first call appearance button is lit on the attendant telephone set. In response to the telephone ring, the attendant presses the Call #1 button and picks up the receiver to answer the call. In a preferred embodiment, the telephone set includes a display 5, such as a light emitting diode (LED), on which the telephone number (caller identification) "(314) 629-1150" of the calling party of the first incoming call is indicated so that the viewer may observe the telephone number of the caller. Alternatively, the name of the caller may also be displayed if that service is subscribed to. It should be noted, however, that the call recovery system in accordance with the present invention is suitable for use with telephone sets that do not have a display. The caller identification of the calling parties are determined using conventional caller identification methods which are well known in the field of telephony. After the telephone call is answered, the attendant may speak to the calling party or may forward the call to the extension of the appropriate party. Each of the next four incoming calls are routed in a similar manner to Call buttons #2, #3, #4 and #5, respectively. The caller identification of the calling party of the incoming call assigned to each call appearance button is stored in the memory device. Regardless of whether a previous call appearance button is "idle" the next incoming call is forwarded to the next available call appearance button in sequential order.

If the fifth call to the appropriate party is disconnected during transfer or otherwise, the attendant may recover the call by pressing the "Call #5" button 14 to automatically redial the telephone number of the fifth calling party, namely, "(302) 333-9399". Thereafter, a sixth incoming call is received at the telephone set, automatically connected to Call button #1, and the stored caller identification corresponding to the incoming call assigned to Call button #1 is updated. Specifically, the telephone number of the sixth calling party "(215) 555-2317" is substituted for the telephone number of the first calling party, "(314) 629-1150" in that portion of the memory device allocated to Call button #1. Because the telephone number associated with Call button #1 has been updated in the memory device if the attendant pushes Call button #1, the telephone number of the sixth calling party, "(215) 555-2317"is automatically dialed. At this time the first incoming call can not be recovered.

In the situation described above the incoming telephone calls are all answered by the attendant. The call recovery method embodying the present invention, however, is also applicable if one or more of the incoming telephone calls are left unanswered. Since the telephone number of an incoming telephone call is identified and stored in the memory device regardless of whether the call is answered, the telephone number of the calling party of an unanswered call may be retrieved by the attendant selecting the call appearance button to which the incoming call has been assigned.

Accordingly, the telephone set embodying the present invention allows the attendant to automatically redial the telephone number of the calling party of any of the incoming telephone calls currently assigned to a call appearance button on the attendant telephone set.

Thus, while there have been shown, described and pointed out fundamental novel features of the invention as applied to a preferred embodiment thereof, it will be understood that various omissions, substitutions and changes in the form and details of the devices illustrated, and in their operation, may be made by those skilled in the art without departing from the spirit and scope of the invention. For example, it is expressly intended that all combinations of those elements and/or method steps which perform substantially the same function, in substantially the same way, to achieve the same results are within the scope of the invention. Substitutions of elements from one described embodiment to another are also fully intended and contemplated. It is also to be understood that the drawings are not necessarily drawn to scale, but that they are merely conceptual in nature. It is the intention, therefore, to be limited only as indicated by the scope of the claims appended hereto.

What is claimed is:

1. A method for recovering calls using an attendant telephone set having a predetermined number of call appearance buttons comprising:

receiving a plurality of incoming telephone calls from calling parties;

identifying a telephone number of the calling party of each incoming telephone call;

assigning each incoming telephone call to a next available call appearance button of said predetermined number of call appearance buttons;

storing the identified telephone number associated with each incoming telephone call in a memory device; and automatically redialing, in response to the attendant's selection of one of the call appearance buttons, the stored telephone number of the calling party of the incoming call assigned to the selected call appearance button.

2. A method in accordance with claim 1, wherein said assigning step comprises assigning each incoming telephone call to a next available call appearance button of said predetermined number of call appearance buttons, in sequential order, starting with a first call appearance button through a last call appearance button, the next call appearance button after the last call appearance button being the first call appearance button.

3. The method in accordance with claim 1, further comprising displaying the stored telephone number of the calling party of the incoming call assigned to the selected call appearance button on a display.

4. A call recovery system for an attendant telephone set receiving multiple incoming telephone calls from calling parties and having a predetermined number of call appearance buttons to which the incoming telephone calls are assigned comprising:

a memory device for storing the identified telephone number of the calling party of each incoming telephone call; and a processor for identifying a telephone number of the calling party of each incoming telephone call and assigning each incoming telephone call to a next available call appearance button of said predetermined number of call appearance buttons, said processor automatically redialing, in response to the attendant's selection of one of the call appearance buttons, the stored telephone number of the calling party of the incoming call assigned to the selected call appearance button.

5. A call recovery system in accordance with claim 4, wherein said processor identifies a telephone number of the calling party of each incoming telephone call and assigns each incoming telephone call to a next available call appearance button of said predetermined number of call appearance buttons in sequential order, starting with a first call appearance button through a last call appearance button, the next call appearance button after the last call appearance button being the first call appearance button.

6. A call recovery system in accordance with claim 4, further comprising a display for displaying the stored telephone number of the calling party of the incoming call assigned to the selected call appearance button.

* * * * *